(12) United States Patent
Martin

(10) Patent No.: US 12,323,412 B2
(45) Date of Patent: Jun. 3, 2025

(54) IDENTIFICATION AUTHENTICATION METHODS AT A DEVICE

(71) Applicant: Kyocera Document Solutions Inc., Osaka (JP)

(72) Inventor: Michael Ong Martin, Pacheco, CA (US)

(73) Assignee: Kyocera Document Solutions Inc., Osaka (JP)

( * ) Notice: Subject to any disclaimer, the term of this patent is extended or adjusted under 35 U.S.C. 154(b) by 307 days.

(21) Appl. No.: 17/886,100

(22) Filed: Aug. 11, 2022

(65) Prior Publication Data

US 2024/0056437 A1  Feb. 15, 2024

(51) Int. Cl.
*H04L 9/40* (2022.01)
(52) U.S. Cl.
CPC .................................. *H04L 63/083* (2013.01)
(58) Field of Classification Search
CPC ........................ H04L 63/083; H04L 2463/092
See application file for complete search history.

(56) References Cited

U.S. PATENT DOCUMENTS

| | | | | |
|---|---|---|---|---|
| 8,650,405 B1* | 2/2014 | Dotan | ..................... | G06F 21/31 713/182 |
| 10,963,202 B2* | 3/2021 | Alacar | ................... | G06F 3/1292 |
| 2006/0218408 A1* | 9/2006 | Serpa | ..................... | G06F 21/34 726/17 |
| 2007/0201389 A1* | 8/2007 | Murayama | ............ | H04W 76/11 370/310 |
| 2010/0309505 A1* | 12/2010 | Partridge | .............. | G06F 3/1292 358/1.15 |
| 2012/0179906 A1* | 7/2012 | Choi | ..................... | H04L 9/0891 713/155 |
| 2014/0070002 A1* | 3/2014 | Pineau | .................. | G06F 21/608 235/382 |
| 2015/0269565 A1* | 9/2015 | Inotay | .................. | G06Q 20/354 235/380 |
| 2016/0112422 A1* | 4/2016 | Watanabe | ........... | H04L 63/0838 726/28 |
| 2016/0314462 A1* | 10/2016 | Hong | .................... | H04L 63/083 |

OTHER PUBLICATIONS

Lee, "Financial Transaction Service Operating System and Method Using QR Code", Oct. 8, 2020, WO 2020/204261 A1 (English Transalation), pp. 1-31 (Year: 2020).*

* cited by examiner

*Primary Examiner* — Jonathan A Bui
(74) *Attorney, Agent, or Firm* — Millen, White, Zelano & Branigan P.C.; William F. Nixon

(57) ABSTRACT

Methods for providing two-factor authentication having identification-obfuscated authentication flow prevents the sending and receiving of a user identification along with a password. An authentication server receives the user identification and generates a graphical code having a unique session code or a PIN code. The unique session code or the PIN code are stored at the authentication server with the user identification. The appropriate code is sent to the device. The device captures the graphical code or the PIN code. The captured code is sent with the password for the user account to the authentication server. The authentication server authenticates that the user identification based on the password is associated with the session code or the PIN code.

5 Claims, 9 Drawing Sheets

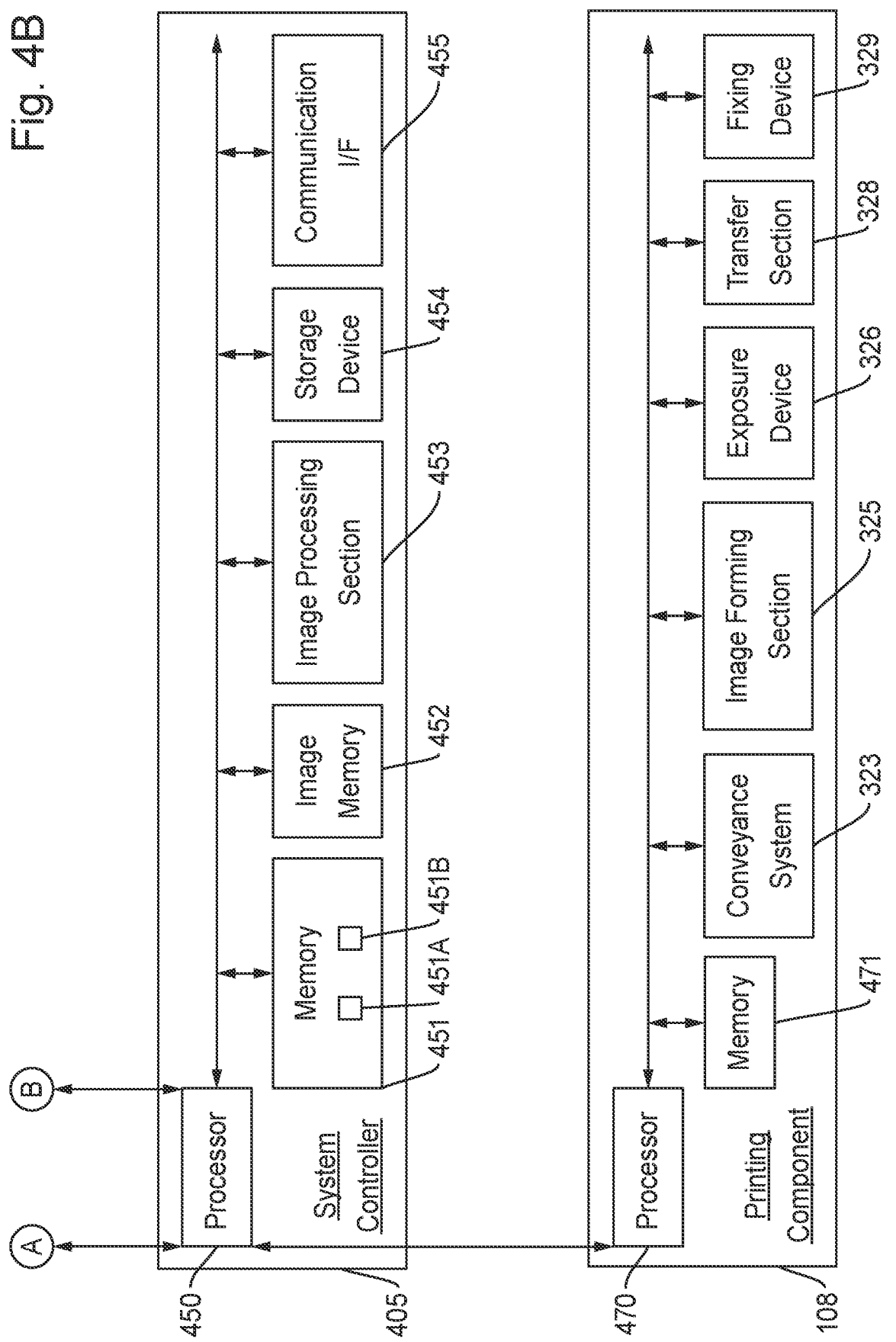

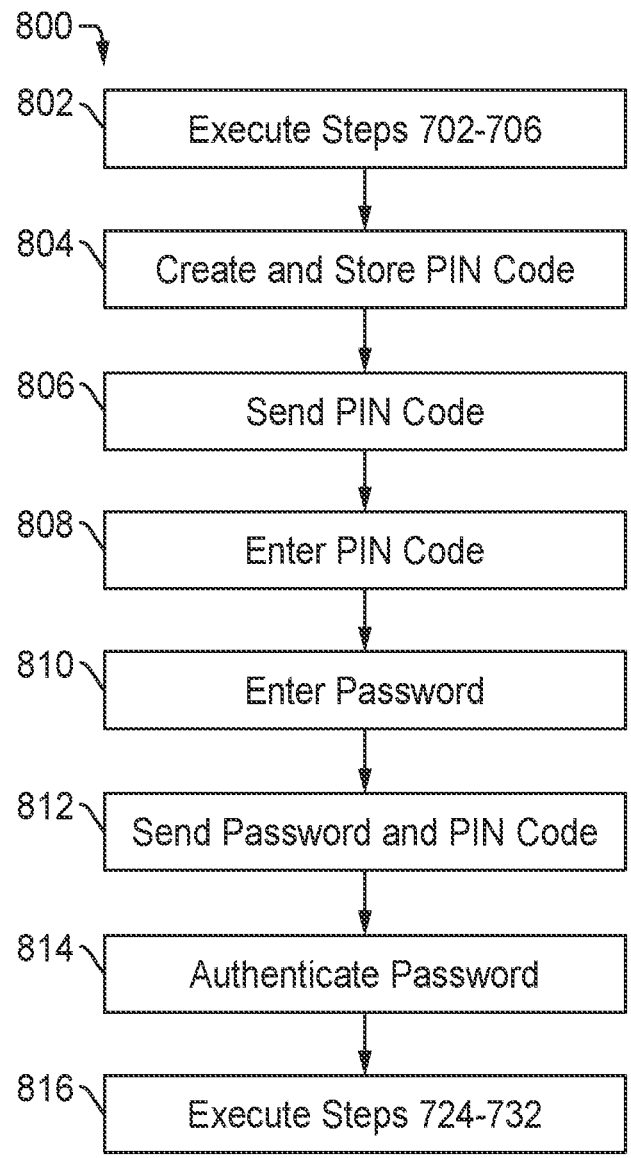

IDENTIFICATION AUTHENTICATION METHODS AT A DEVICE

FIELD OF THE INVENTION

The present invention relates to performing identification authentication at a device by separating the identification from the password so both parts of the user credential cannot be associated with each other.

DESCRIPTION OF THE RELATED ART

Known authentication systems may use two-factor authentication. Two-factor authentication may involve entering user credentials, such as identification, username, email plus a password, as the first step in authentication. The second step may involve a unique one-time use code. The one-time code is entered to verify the user. The first step, however, is vulnerable to man-in-the-middle attacks to obtain the identification/username/email and password pair.

SUMMARY OF THE INVENTION

A method for identification authentication at a device is disclosed. The method includes receiving a user identification at an authentication server from a device to initiate a user session. The method also includes creating a unique session code at the authentication server in response to the user identification received from the device. The method also includes displaying a graphical code at the device. The graphical code includes the unique session code. The method also includes scanning the graphical code using a mobile device to capture the unique session code. The method also includes sending the unique session code and a password corresponding to the user identification to the authentication server. The method also includes authenticating the user session at the device by confirming the unique session code and the password at the authentication server.

A method for identification authentication at a device is disclosed. The method includes receiving a user identification at an authentication server to initiate a user session. The method also includes creating a personal identification number (PIN) code at an authentication server in response to the user identification received from the device. The method also includes sending the PIN code to a mobile device associated with the user identification. The method also includes receiving the PIN code from the device hosting the user session along with a password corresponding to the user identification. The method also includes authenticating the user session at the device by confirming the PIN code and the password at the authentication server.

A method for authenticating a printing operation in a printing system is disclosed. The method includes receiving a print job at a printing device. The print job includes a security status. The method also includes prompting a user identification to be entered at the printing device based on the security status. The method also includes receiving the user identification at an authentication server from the printing device to initiate the printing operation for the print job. The method also includes creating a unique session code at the authentication server in response to the user identification received from the printing device. The method also includes displaying a graphical code at the printing device. The graphical code includes the unique session code. The method also includes scanning the graphical code using a mobile device to capture the unique session code. The method also includes sending the unique session code and a password corresponding to the user identification to the authentication server. The method also includes authenticating the printing operation at the printing device by confirming the unique session code and the password at the authentication server. The method also includes forwarding an instruction to the printing device to allow the printing operation for the print job.

BRIEF DESCRIPTION OF THE DRAWINGS

Various other features and attendant advantages of the present invention will be more fully appreciated when considered in conjunction with the accompanying drawings.

FIG. 4B further illustrates the block diagram of an example control system for the MFP according to the disclosed embodiments.

FIG. 8 illustrates another flowchart for performing authentication identification at a mobile device or a MFP according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments of an alternate two-factor authentication identification-obfuscated flow aim to separate the identification from the password so that both parts of the user credential are not associated with each. A hacker may not use them together as they are kept secret in the authentication process. Another device, such as a mobile device or a printing device, may still be needed because the device is another factor in a two-factor authentication flow.

In some embodiments, a user enters their identification at the device. An authentication server creates a unique session code associated with the user identification for reference later when the user enters their password. A graphical code, such as a Quick Response (QR) code, is displayed for the user to scan using their mobile device. The QR code contains the one-time session code and has no trace of the user identification associated with it. The user enters their password. The one-time session code and password are sent to the authentication server via REST API. When the authentication is successful on the server side, the one-time session code is invalidated. It may be deleted from the database and not associated with a user identification. The one-time session code may no longer be used to authenticate.

In other embodiments, the user is logged onto a mobile device, or enters their identification from a mobile device to generate a one-time use PIN code. This PIN code is associated with the user identification. The user enters the PIN code to the device. A prompt for a password will be shown. Alternatively, the usual user identification and password prompt may be shown on the device but the user identification field can accept the user identification or the one-time use PIN code. The authentication server ensures that the one-time use PIN code is unique and not associated already with another user identification. The user enters their password. The one-time use PIN code and password are sent to the authentication server via REST API. When the authentication is successful on the authentication server side, the one-time use PIN code is invalidated. It may be deleted from the database and no longer associated with a user identification. The one-time use PIN code can no longer be used to authenticate.

Figure 1:
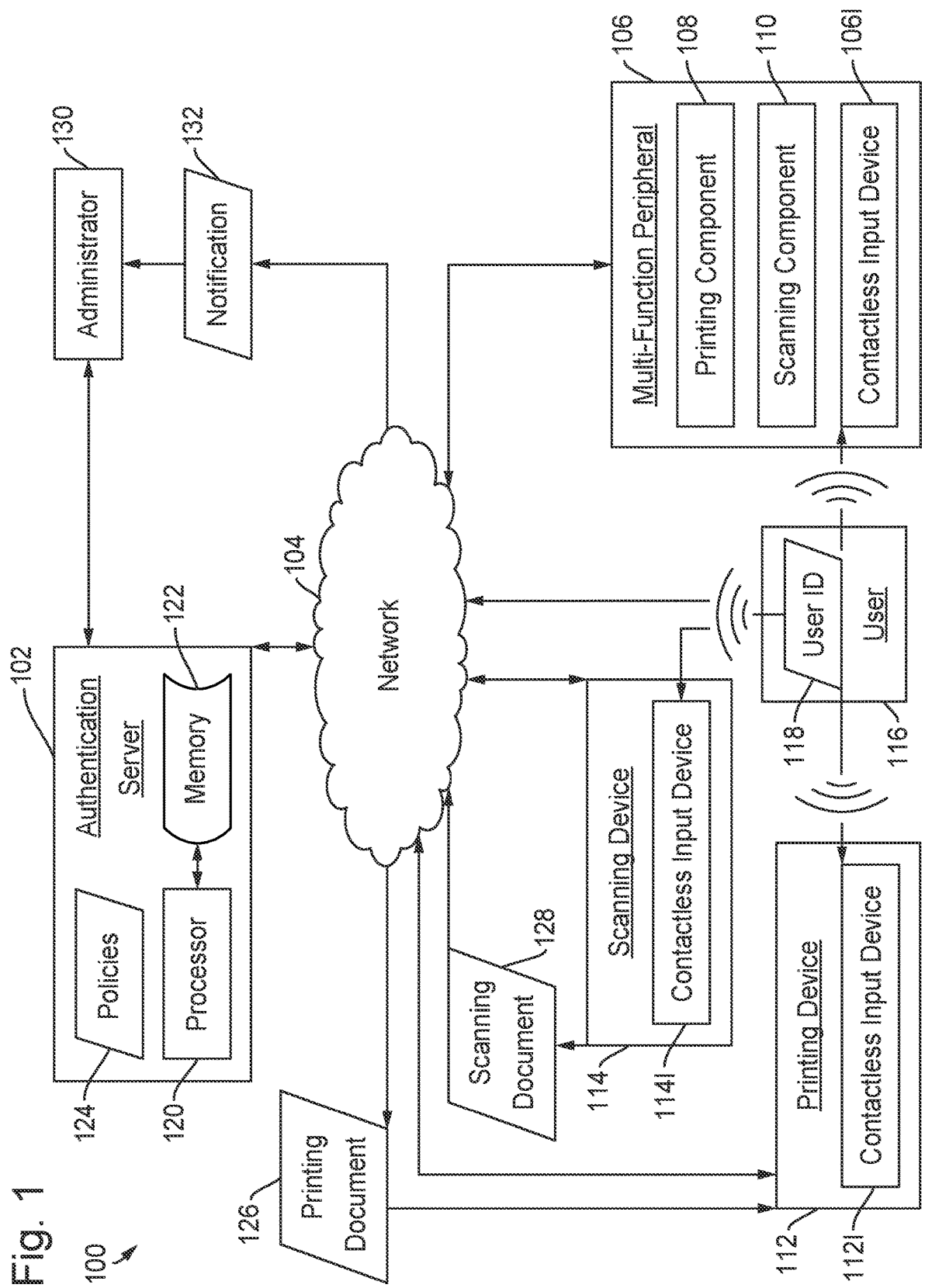
FIG. 1 illustrates a document processing system according to the disclosed embodiments.

FIG. 1 depicts a document processing system 100 to register an identification card for access to a cloud-based network 104 according to the disclosed embodiments. Document processing system 100 includes authentication server 102, which may manage document management operations within the system using policies 124. Authentication server 102 also includes a processor 120 and a memory 122. Memory 122 may store instructions that, when executed by processor 120, configure authentication server 102 to perform certain functions. Authentication server 102 also may provide instructions to other components within system 100 as defined by policies 124.

System 100 also may include multi-functional peripheral (MFP) 106. MFP 106 is disclosed in greater detail below by FIGS. 2-4B. MFP 106 may include printing component 108 and scanning component 110. System 100 also includes printing device 112 and scanning device 114. These devices may perform printing operation and scanning operations, respectively, while MFP 106 may be able to perform both types of operations at a single device. Authentication server 102 may communicate with MFP 106, printing device 112, and scanning device 114 via network 104.

A user 116 may desire to print a document, scan a document, or both. The disclosed embodiments allow user 116 to do so without touching any component, screen, part, or the like of MFP 106, printing device 112, or scanning device 114. User 116 may log onto a peripheral device using a contactless input device. Once logged on, the peripheral device queries authentication server 102 via network 104 with the user identification 118 provided by user 116. Authentication server 102 checks an applicable policy of policies 124 for a user profile associated with user identification 118. The policy sets forth actions that may be taken on behalf of user 116 at the applicable device. Thus, user 116 does not touch the device in order to perform printing or scanning operations as the instructions are provided by authentication server 102 according to the applicable policy.

MFP 106 includes contactless input device 1061. Printing device 112 includes contactless input device 1121. Scanning device 114 includes contactless input device 1141. The contactless input devices may be devices that allow a reader scan a graphic provided on a card or mobile device of user 116. Alternatively, the contactless input devices may be identification card readers that allow user 116 to move a card having a magnetic strip or chip through the reader to provide information. The contactless input devices obtain user identification 118 from the card, graphic, barcode, magnetic strip, chip, and the like without the need for user 116 to input information directly at the applicable device.

The disclosed embodiments may use policies 124 to print or scan documents. For example, user 116 may log onto printing device 112 using contactless input device 1121. Contactless input device 1121 reads a QR code from a lanyard card of user 116. User identification 118 is determined from the QR code, which matches user 116. Printing device 112 provides user identification 118 to cloud-based server 102. Cloud-based server 102 looks up the user profile associated with user identification 118. Within user profile is one or more policies 124 that apply to user 116. The policies may be specific to the user or may be specific to a group of users including user 116. In addition, the user profile may list one or more documents for printing, as indicated by user 116. User 116 may select these documents to be printed using a document management service application. The documents are printed according to the instructions provided by the applicable policies 124.

An example user policy may invoke a function to enable print documents upon log on at printing device 112. Upon log on by user 116 to printing device 112, the printing device acquires printing policies 124 from authentication server 102. Afterwards, printing device 112 will print each queued job from the user profile at cloud-based server 102 until the end of the last job or a print limit. In other words, there may be a limit on the amount of printing available to user 116 as set forth by one or more policies 124. Thus, authentication server 102 may send print document 126 to printing device 112 for printing as instructed by the applicable policy. The user policy also may invoke a function to enable log out after printing the last document. Upon printing the last print job, printing device 112 will log out user 116 automatically. User 116 does not need to enter information or press a button to stop printing.

For an organization or group policy, in addition to the above, this policy may invoke a function to enable print limit overrides upon exceeding a print limit. Upon reaching typical print limits, further printing operations are allowed to continue for specific users or groups. Specific users are allowed to exceed limits despite potentially incurring additional usage costs. These users may be supervisors or users having special jobs to complete. Further, policies 124 may be changed to allow such a function for a specified period of time. The group policy also may enable a function to enable notification 132 to administrator 130 for system 100. Cloud-based server 102 may send notification 132 to organization administrator 130 for support automatically upon reaching the limit. Administrator 130 may override the limit to allow print document 126 to print at printing device 112. This policy may be mutually exclusive with policies allowing a user to exceed the limit.

In other embodiments, user 116 may access scanning device 114. Use of scanning device 114 differs from printing device 112. User 116 logs onto scanning device 114 using contactless input device 1141. Scanning device 114 obtains user identification 118 and forwards it to cloud-based server 102. Authentication server 102 associates user identification 118 with the user profile having policies 124. A policy may govern scanning operations for user 116.

For example, a policy may instruct scanning device 114 to determine if any documents are present at the device. One or more documents may be loaded into an automated document feeder (ADF) for scanning device 114. Alternatively, one or more documents, preferably a sheet, are placed on the platen glass for scanning device 114. Scanning device 114 may then be instructed to scan the one or more documents to generate scan document 128. Scan document 128 may be an image file of the document placed at scanning device 114. Thus, the policy may invoke a function to enable scanning of a loaded document upon log on by user 116. Upon user log on, scanning operations will commence if documents are loaded onto the platen glass or the ADF.

The policy also may include additional settings required to complete scans automatically, such as destination settings and scan settings. Destination settings pertain to where scan document 128 is sent after scanning is complete. Destination settings may specify authentication server 102 or another location within system 100 to receive scan document 128. For authentication server 102, the policy may instruct the server to store scan document 128 with the associated user profile. Alternatively, the policy may instruct scanning device 114 to send scans of "small" documents directly to email for user 116. These features prevent large scan jobs from cluttering the email (and associated email server) account.

Scan settings may specify scanning features, such as grayscale, resolution, and the like. Scanning device 114 implements the scan settings set forth by the policy. In other embodiments, the policy may override scan settings for documents coming from different scanner source, such the ADF as opposed to the platen glass. The policy also may invoke a function to enable log out after scanning operations are complete. When the last document is scanned, scanning device 114 will log out user 116 automatically. This feature allows scanning device 114 to be made available in an efficient manner.

The log out feature for printing device 112 and scanning device 114 may be desirable as user 116 may leave the vicinity of the devices. User 116 does not need to physically press a button to release the device to perform other operations. The policy instructs the device to log out as soon as operations are completed. Thus, the applicable device is returned to system 100 for use.

Policies 124 also include group or organization policies for scanning operations. Such a policy may enable a scan limit override upon exceeding a scan limit. Upon reaching typical scan limits, the disclosed embodiments may allow further scanning to continue for specific users or groups. The allowance of specific users to exceed limits may happen despite potentially incurring additional usage costs. The policy also may invoke a function to enable notification 132 be sent to administrator 130 upon exceeding the scan limit. Notification 132 is sent to administrator 130 for support automatically upon reaching the scan limit. Administrator 130 may take action to allow scanning operations to continue or modify policies 124 to allow the override. This policy may be mutually exclusive with policies allowing the scan limits to be exceeded.

Administrator 130 may set the parameters for policies 124 within an organization. The administrator also may set up the groups of users applicable to policies 124 that deal with organization level issues. Administrator 130 also may set limits for users 116 for printing and scanning Administrator 130 may access authentication server 102 remotely to manage policies 124.

It should be noted that MFP 106 includes printing component 108 and scanning component 110. Printing component 108 may operate within document processing system 100 much like printing device 112. Policies 124 set forth functions and limits available at MFP 106 for printing operations. Scanning component 110 may operate much like scanning device 114. Print document 126 may be received at MFP 106 and scan document 128 sent from MFP 106, depending what is being done by user 116. Policies 124 may create a hierarchy of actions to be done at MFP 106 so that operations do not interfere with each other. This feature is disclosed in greater detail below.

Figure 2:
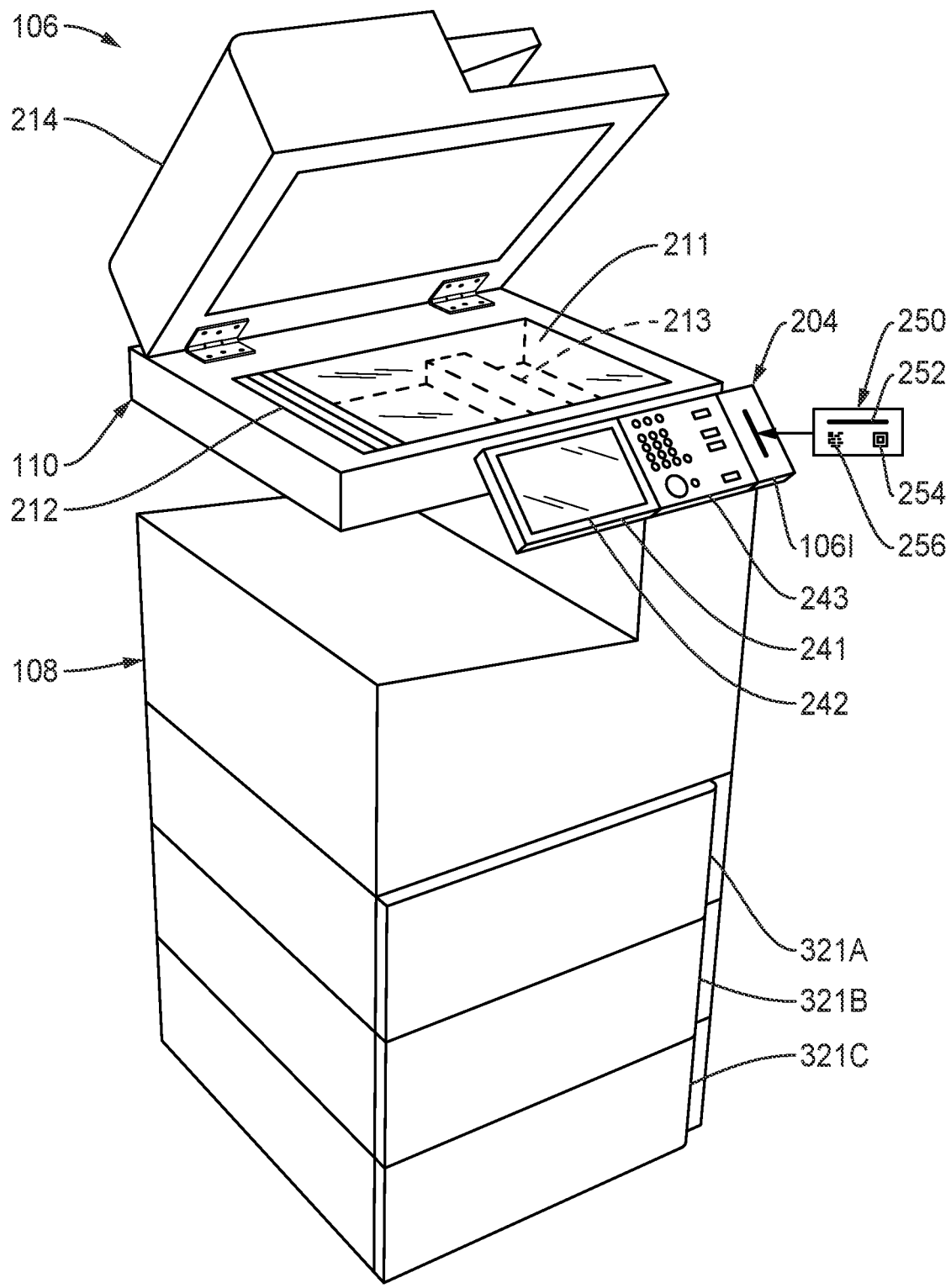
FIG. 2 illustrates a perspective view of a multi-functional peripheral (MFP) as an image forming apparatus according to the disclosed embodiments.
Figure 3:
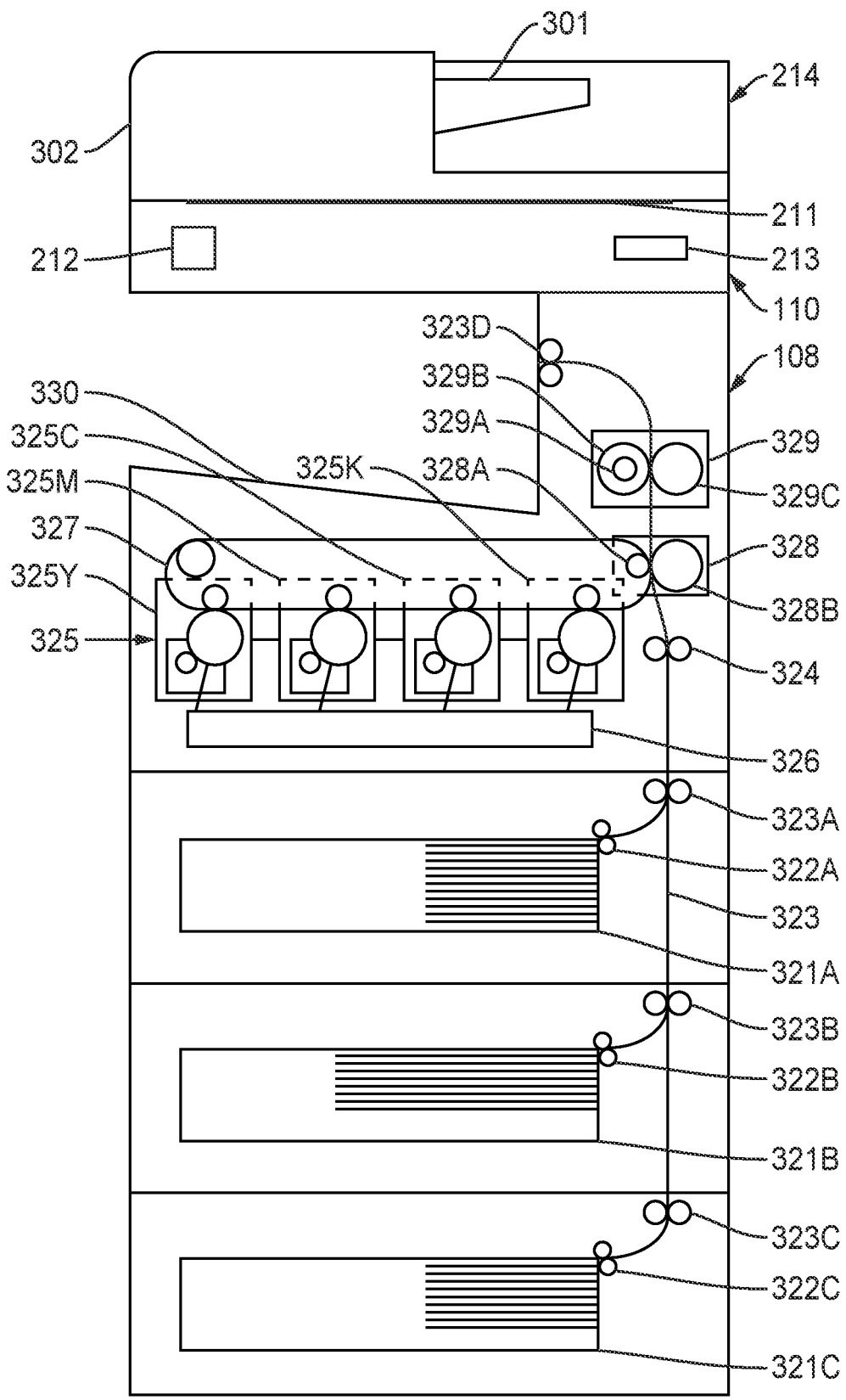
FIG. 3 illustrates a cross-sectional view of the MFP according to the disclosed embodiments.

FIG. 2 depicts a perspective view of MFP 106 as an image forming apparatus according to the disclosed embodiments. FIG. 3 depicts a cross-sectional view of MFP 106 according to the disclosed embodiments. As shown in FIG. 2, MFP 106 includes scanning component 110, printing component 108, and an operation panel 204. Scanning component 110 is provided at an upper part of a main body of MFP 106. Scanning component 110 has a document table, or platen, glass 211 on which a document to be scanned is placed. Scanning component 110 includes an image reading mechanism that scans the document on platen glass 211.

Figure 4A:
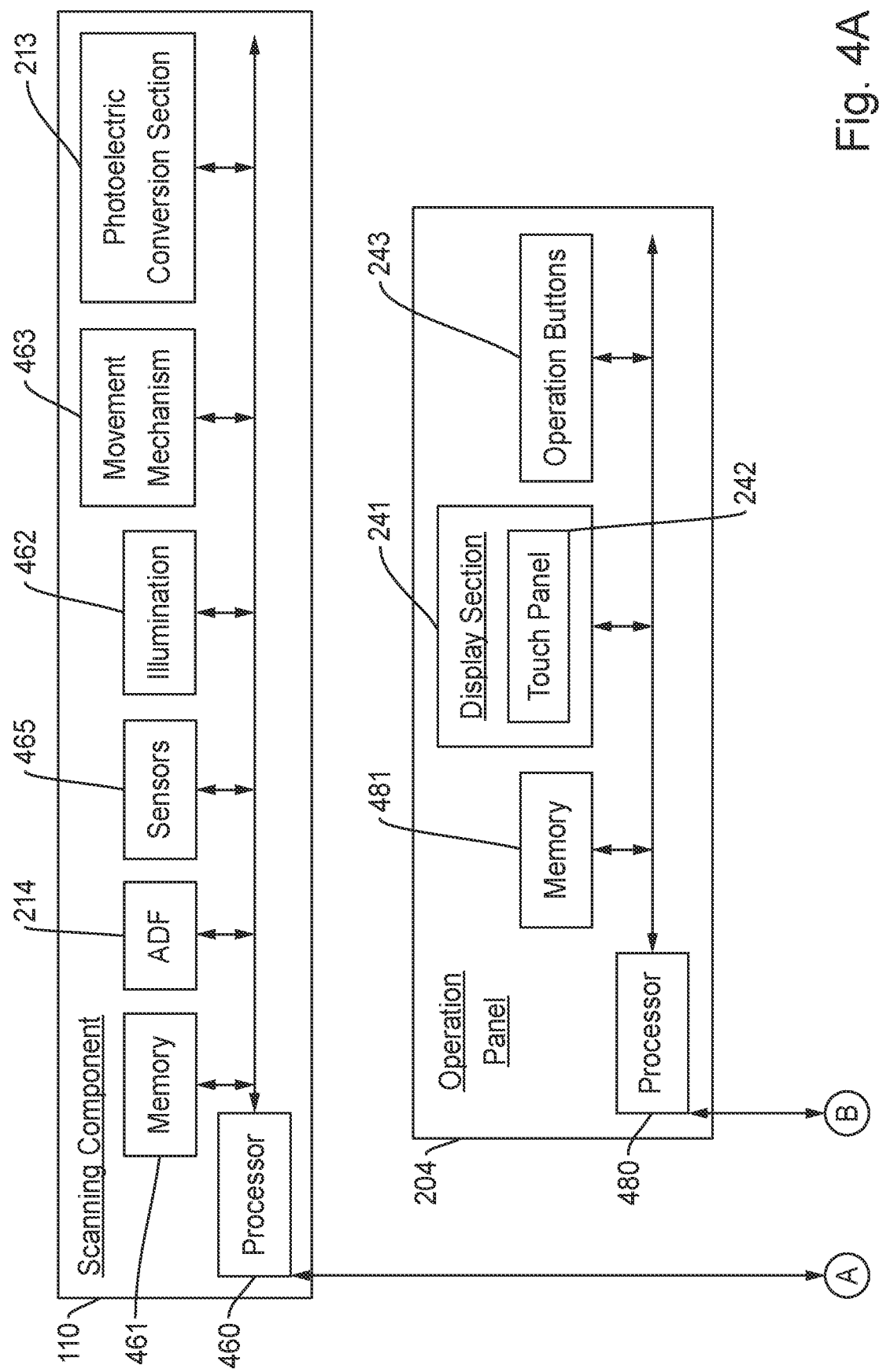
FIG. 4A illustrates a block diagram of an example control system for the MFP according to the disclosed embodiments.

Scanning component 110 also includes a carriage 212 and a photoelectric conversion section 213. Carriage 212 and photoelectric conversion section 213 are provided below platen glass 211. Carriage 212 includes an illumination 462, as shown in FIGS. 4A and 4B, and an optical system such as a mirror. Illumination 462 is provided in carriage 212 to irradiate a reading position on platen glass 211 with light. The reading position on platen glass 211 irradiated by illumination 462 with the light is an image corresponding to one line, or a plurality of lines, in a main scanning direction. The optical system such as a mirror provided in carriage 212 guides a light, or reflected light, from the reading position irradiated by illumination 462 to photoelectric conversion section 213.

Carriage 212 is moved in a sub-scanning direction below platen glass 211 by a movement mechanism 463, as shown in FIGS. 4A and 4B, including a stepping motor or the like. A position of carriage 212 is determined in an initial operation, and the movement thereof in the sub-scanning direction is controlled based on the determined position. For example, carriage 212 is moved in the sub-scanning direction to continuously guide an image of each line in the main scanning direction in a document reading area on platen glass 211 wherein the document is placed to photoelectric conversion section 213.

Photoelectric conversion section 213 includes a lens, a photoelectric conversion sensor, and a cover. The lens condenses the light guided by the optical system of carriage 212 to guide the light to the photoelectric conversion sensor. The photoelectric conversion sensor includes photoelectric conversion elements. The photoelectric conversion sensor, for example, may be a line sensor in which charge coupled devices (CCDs) or contact image sensors (CISs) as photoelectric conversion elements are arranged in a line. The line sensor as the photoelectric conversion sensor converts the image corresponding to one line in the main scanning direction, reflected light by a document surface, into pixel data corresponding to one line.

Carriage 212 includes an exposure lamp and the optical system, such as a mirror, and is moved below platen glass 211 in the sub-scanning direction. Carriage 212 moves the reading position on platen glass 211 leading to photoelectric conversion section 213 in the sub-scanning direction. Specifically, scanning component 110 adjusts the reading of the image in the sub-scanning direction by controlling the movement of carriage 212. Scanning component 110 reads the image of the entire document be acquiring the image data in the main scanning direction converted by photoelectric conversion section 213 while moving carriage 212 in the sub-scanning direction.

Scanning component 110 also includes ADF 214. ADF 214 also functions as a document table cover and is provided in an openable manner. When ADF 214 is closed, it covers the entire document reading area on platen glass 211. ADF 214 includes a sheet feed tray 301 and a conveyance system 302, as illustrated in FIG. 3. Sheet feed tray 301 of ADF 214 holds a document of sheets to be read. Conveyance system 302 of ADF 214 picks up the sheets of the document set in sheet feed tray 301 one by one to convey them so that a reading surface of each sheet taken out passes through a predetermined reading position. Using this process, scanning component 110 may generate scan document 128.

As illustrated in FIG. 3, printing component 108 includes sheet feed cassettes 321A, 321B, and 321C. Additional feed cassettes may be loaded onto MFP 106. Each of sheet feed cassettes 321A, 321B, and 321C accommodates a sheet as an image forming medium on which an image is to be printed. For example, each of sheet feed cassettes 321A, 321B, and 321C is detachable from the lower part of MFP 106. Sheet feed cassettes 321A, 321B, and 321C have sheet feed rollers 322A, 322B, and 322C, respectively. Sheet feed rollers 322A, 322B, and 322C pick up sheets one by one from sheet feed cassettes 321A, 321B, and 321C, respectively.

Conveyance system 323 conveys a sheet in printing component 108. Conveyance system 323 includes a plurality of conveyance rollers 323a, 323b, 323c, and 323d as well as a registration roller 324. Conveyance system 323 conveys the sheet taken from sheet feed rollers 322A, 322B, or 322C to registration roller 324. Registration roller 324 conveys the sheet to a transfer position in accordance with a timing at which an image is transferred.

An image forming section 325 includes a plurality of image forming sub-sections 325Y, 325M, 325C, and 325K to form images of respective colors (yellow, magenta, cyan, and black). An exposure device 326 forms an electrostatic latent image as an image to be developed in each color on each image carrier in each of image forming sub-sections 325Y, 325M, 325C, and 325K. Exposure device 326 forms the electrostatic latent image on the image carrier by exposing the image carrier with the light emitted in response to the image data. For example, exposure device 326 exposes a photoconductive drum as the image carrier in the main scanning direction by irradiating the photoconductive drum via a rotating polygon mirror with the light emitted by a light emitting section. The irradiation position of the light from exposure device 326 moves in the sub-scanning direction as the photoconductive drum rotates. Specifically, a position and magnification of an image formed by image forming section 325 are adjusted by controlling exposure device 326.

Image forming sub-sections 325Y, 325M, 325C, and 325K develop electrostatic latent images on the respective image carriers with toners of respective colors (yellow, magenta, cyan, and black). Intermediate transfer belt 327 is an intermediate transfer member. Image forming sub-sections 325Y, 325M, 325C, and 325K transfer toner or ink images for respective colors developed with the toners or inks of respective colors on respective image carriers onto intermediate transfer belt 327, or the primary transfer.

Intermediate transfer belt 327 conveys the transferred toner or ink image to a secondary transfer position while holding the toner or ink image. The secondary transfer position is a position where the toner or ink image on intermediate transfer belt 327 is transferred onto a sheet. At the secondary transfer position, a support roller 328a and secondary roller 328b face each other. Support roller 328a and secondary transfer roller 328b constitute a transfer section 328. Registration roller 324 conveys the sheet to the secondary transfer position in accordance with a timing at which the toner or ink image on intermediate transfer belt 327 is transferred. Transfer section 328 transfers the toner or ink image held on intermediate transfer belt 327 onto the sheet at the secondary transfer position.

For example, in the case of forming a color image, image forming sections 325Y, 325M, 325C, and 325K transfer toner or ink images developed with toners or inks of respective colors (yellow, magenta, cyan, and black) onto intermediate transfer belt 327 by overlapping the toner or ink images on the intermediate transfer belt. Intermediate transfer belt 327 holds a color image obtained by overlapping the toner or ink images for respective colors. Transfer section 328 transfers the color image formed with the toners or inks of plural colors on intermediate transfer belt 327 onto the sheet at the secondary transfer position. Registration roller 324 conveys the sheet to the second transfer position in according with a timing at which the toner or ink image on intermediate transfer belt 327 is transferred. As a result, the color image is transferred onto the sheet.

Transfer section 328 supplies the sheet onto which the toner or ink image is transferred to a fixing device 329. Fixing device 329 fixes the toner or ink image on the sheet. Fixing device 329 has a heating section 329a, a heat roller 329b, and a pressure roller 329c. Heating section 329a heats heat roller 329b. Heat roller 329b and pressure roller 329c perform a fixing processing of heating and pressurizing the sheet onto which the toner or ink image is transferred by transfer section 328. Heat roller 329b and pressure roller 329c of fixing device 329 transmit the sheet on which the fixing processing is performed to conveyance roller 323d. Conveyance roller 323d conveys the sheet from fixing device 329 to a sheet discharge section 330.

As illustrated in FIG. 2, operation panel 204 is a user interface. Operation panel 204 displays guidance and receives an input of an operation button or icon. For example, a user inputs setting information with operation panel 204. Operation panel 204 includes a display section, or display, 241, a touch panel 242, and a plurality of operation buttons 243. For example, touch panel 242 is provided on a display screen of display section 241. Touch panel 242 detects a portion touched by user 116 on the display screen of display section 241.

The disclosed embodiments may avoid the actions taken with regards to operations panel 204 by using contactless input device 1061. Instead of pushing buttons 243 or touching touch panel 242, the disclosed embodiments may obtain user identification 118 using contactless input device 1061. For example, a card 250 may be provided by user 116. Alternatively, card 250 may be a card attached to a lanyard normally carried by employees or people within an organization or location. Card 250 may be placed into contactless input device 1061 to provide information on user 116. Such information may be a user name 252, as shown on card 250. Contactless input device 1061 may associate user name 252 with user identification 118. Information associated with user 116 may be read by contactless input device 1061 from embedded chip 254 within card 250. It also may be read from graphical code 256. Graphical code 256 may be scanned by input device 1061 and may include a barcode, a QR code, and the like. In this way, user identification 118 is provided to MFP 106 without the need to make contact with any component, buttons, or screen thereon.

FIGS. 4A and 4B depict a block diagram of an example control system for MFP 106 according to the disclosed embodiments. MFP 106 includes a system controller 405 that may control printing component 108, scanning component 110, and other components on the MFP. System controller 405 is connected to scanning component 110, printing component 108, and operation panel 204. As shown in FIGS. 4A and 4B, system controller 405 includes a processor 450, a memory 451, an image memory 452, an image processing section 453, a storage device 454, and a communication interface (UF) 455.

Processor 450 is connected to processor 460 of scanning component 110, processor 470 of printing component 108, and processor 480 of operation panel 204 via applicable interfaces. Processor 450 may perform various processing functions by executing programs stored in memory 451 or storage device 454. For example, by executing a program stored in memory 451, processor 450 output an operation instruction to each section and processes various kinds of information from each section.

Memory 451 includes memories such as a random access memory (RAM), a read only memory (ROM), a non-volatile memory (NVM), and the like. The RAM functions as a working memory or a buffer memory. The ROM is a non-rewritable nonvolatile memory. The ROM functions at a program memory. The NVM is a rewriteable nonvolatile memory. The NVM stores setting data for scanning component 110 and printing component 108, and the like.

Memory 451 may include storage area 451a and storage area 451b. Storage area 451a and storage area 451b are rewritable nonvolatile memory areas. Storage area 451a stores information indicating a size of a sheet used for image adjustment in which a below-disclosed setting value to be stored is obtained. Storage area 451b stores sheet information used for correcting the setting value for the image adjustment.

Image memory 452 stores the image data. For example, image memory 452 functions as a page memory for copying or decompressing the image data to be processed. Image processing section 453 processes the image data. To output the processed image data, image processing section 453 performs image processing such as correction, compression, or decompression on the input image data to output the processed image data.

Storage device 454 stores control data, control programs, and data such as setting information. Storage device 454 is a rewritable nonvolatile memory. For example, storage device 454 may be a hard disk drive (HDD) or a solid state drive (SSD).

Communication I/F 455 is used for establishing data communication with an external device. For example, communication I/F 455 functions as an image acquisition section that acquires an image to be printed on the sheet from an external device such as a personal computer (PC). Communication I/F 455 also functions as an interface for communicating with a server, such as authentication server 102.

An example of a configuration of a control system in scanning component 110 may be disclosed below. Scanning component 110 includes processor 460, memory 461, ADF 214, illumination 462, movement mechanism 463, and photoelectric conversion section 213. Processor 460 performs various kinds of processing by executing programs stored in memory 461. For example, by executing a program, processor 460 controls the operation of each section of scanning component 110, and monitors an operation state of each section. Processor 460 is connected to processor 450 of system controller 405. Processor 460 executes scanning processing in response to an operation instruction from system controller 405.

Memory 461 includes a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

ADF 214 has a pickup roller and a conveyance system 302 as a configuration of a control system. Processor 460 drives the pickup roller and conveyance system 302 to convey the documents one by one to the reading position. ADF 214 also may include sensors 465 located on sheet feed tray 301 to detect the presence of a document or sheets. Sensors 465 also may be located on or adjacent platen glass 211 to detect when a document or sheet is placed thereon. Sensors 465 may alert scanning component 110 that documents need to be scanned.

Illumination 462 is provided in carriage 212 to irradiate the reading position on platen glass 211 with light. Illumination 462 has a light source that emits light in response to a lighting instruction from processor 460. The light source is not limited to having a specific configuration. The light emitted by illumination 462 is reflected by the document placed on platen glass 211 and then enters photoelectric conversion section 213 via the optical system such as a mirror, a lens, and the like.

Movement mechanism 463 moves carriage 212. Movement mechanism 463 includes a stepping motor as a driving source and moves carriage 212 according to the driving of the stepping motor. Movement mechanism 463 moves carriage 212 in response to operation instructions from processor 460 or processor 450 of system controller 405. For example, at the time of scanning the document on platen glass 211, processor 460 moves carriage 212 from a reading start position in the sub-scanning direction (FWD direction).

Photoelectric conversion section 213 includes a photoelectric conversion sensor including photoelectric conversion elements for converting incident light into an electrical signal. Photoelectric conversion section 213 includes, for example, a photoelectric conversion sensor, which is a line sensor for generating pixel data corresponding to one line read in the main scanning direction. Photoelectric conversion section 213 also has a lens for inputting the light guided by the optical system provided in carriage 212 to the photoelectric conversion sensor. Specifically, the photoelectric conversion section 213 sequentially outputs the pixel data corresponding to each line read in the main scanning direction as carriage 212 moves in the sub-scanning direction.

An example of a configuration of a control system for printing component 108 is disclosed. Printing component 108 includes processor 470, memory 471, conveyance system 323, image forming section 325, exposure device 326, transfer section 328, and fixing device 329. Processor 470 performs various kinds of processing by executing programs stored in memory 471. For example, by executing a program, processor 470 controls the operation of each section of printing component 108 and monitors an operation state of each section. Processor 470 is connected to processor 450 of system controller 405 via the interface. Processor 470 executes a printing processing in response to an operation instruction from system controller 405.

Memory 471 includes memories such as a RAM, a ROM, a data memory, and the like. The RAM functions as a working memory or a buffer memory. The ROM is a non-rewritable nonvolatile memory. The ROM functions as a program memory. The data memory is a rewritable non-volatile memory.

Conveyance system 323 conveys the sheet in printing component 108 under the control of processor 470. Specifically, conveyance system 323 drives conveyance rollers of the respective sections in response to an operation instruction from processor 470 to convey the sheet.

In response to the operation instruction from processor 470, exposure device 326 emits light, such as a laser light, for forming an electrostatic latent image on the photoconductive drum of each image forming section 325. Processor 470 adjusts a printing position and a magnification by controlling the irradiation position of the laser light on the photoconductive drum by exposure device 326. Processor 470 executes image adjustment such that a printing area becomes a desired printing area by performing operation control according to a printing area starting from a printing reference.

Image forming section 325 develops the electrostatic latent images formed on the photoconductive drums with toners or inks of respective colors in response to operation instructions from processor 470. Image forming section 325 transfers the toner or ink image formed on the photoconductive drum onto intermediate transfer belt 327, or the primary transfer. Transfer section 328 transfers the toner or ink image transferred onto intermediate transfer belt 327 onto the sheet, or the secondary transfer, in response to an operation instruction from processor 470.

Fixing device 329 drives heat roller 329b and pressure roller 329c in response to an operation instruction from processor 470. Heating section 329a of fixing device 329 heats the surface temperature of heat roller 329b to a desired fixing temperature under the control of processor 470. In a state in which fixing device 329 is controlled at the fixing temperature, fixing device 329 fixes the toner or ink image transferred onto the sheet.

An example of configuration of a control system for operation panel 204 is disclosed. Operation panel 204 includes a processor 480, memory 481, display section 241, touch panel 242, and operation buttons 243. Processor 480 performs various kinds of processing by executing programs stored in memory 481. For example, processor 480 executes a program to control the operation of each section of operation panel 204 and to monitor an operation state of each section. Processor 480 is connected to processor 450 of system controller 405. For example, processor 480 provides system controller 405 with information input by user 116, or read by contactless input device 1061.

Memory 481 includes memories such as a RAM, a ROM, a data memory, and the like. The RAM functions as a working memory or a buffer memory. The ROM is a non-rewritable nonvolatile memory. The ROM functions as a program memory. The data memory is a rewritable non-volatile memory.

Display contents of display section 241 are controlled in response to an operation instructions from processor 480. Touch panel 242 is provided on the display screen of display section 241 to detect a touched position on the display screen. For example, processor 480 displays an operation guidance and icons capable of being selected with touch panel 242 on the display screen of display section 241. Processor 480 determines information input by user 116 according to the touched position detected by touch panel 242. Operation buttons 243 include hard keys such as a start key, a reset key, and the like.

According to the disclosed embodiments, printing component 108 and scanning component 110 may be operated without the need to use touch panel 242 or buttons 243. Instead, operations may be implemented by processors 460, 450, and 470 by policies 124 at authentication server 102. In other words, the instructions implemented by the processors are fed to the various components from authentication server 102 and does not require the need for user 116 to input any information or take any action beyond logging onto MFP 106.

It should be noted that the features disclosed for printing component 108 also are applicable for printing device 112. Printing device 112 may include components as disclosed in FIGS. 3 and 4 pertaining to printing component 108 including operation panel 204 and system controller 405. Further, the features disclosed for scanning component 110 also are applicable for scanning device 114. Scanning device 114 may include components as disclosed in FIGS. 3 and 4 pertaining to scanning component 110 including operation panel 204 and system controller 405.

Figure 5:
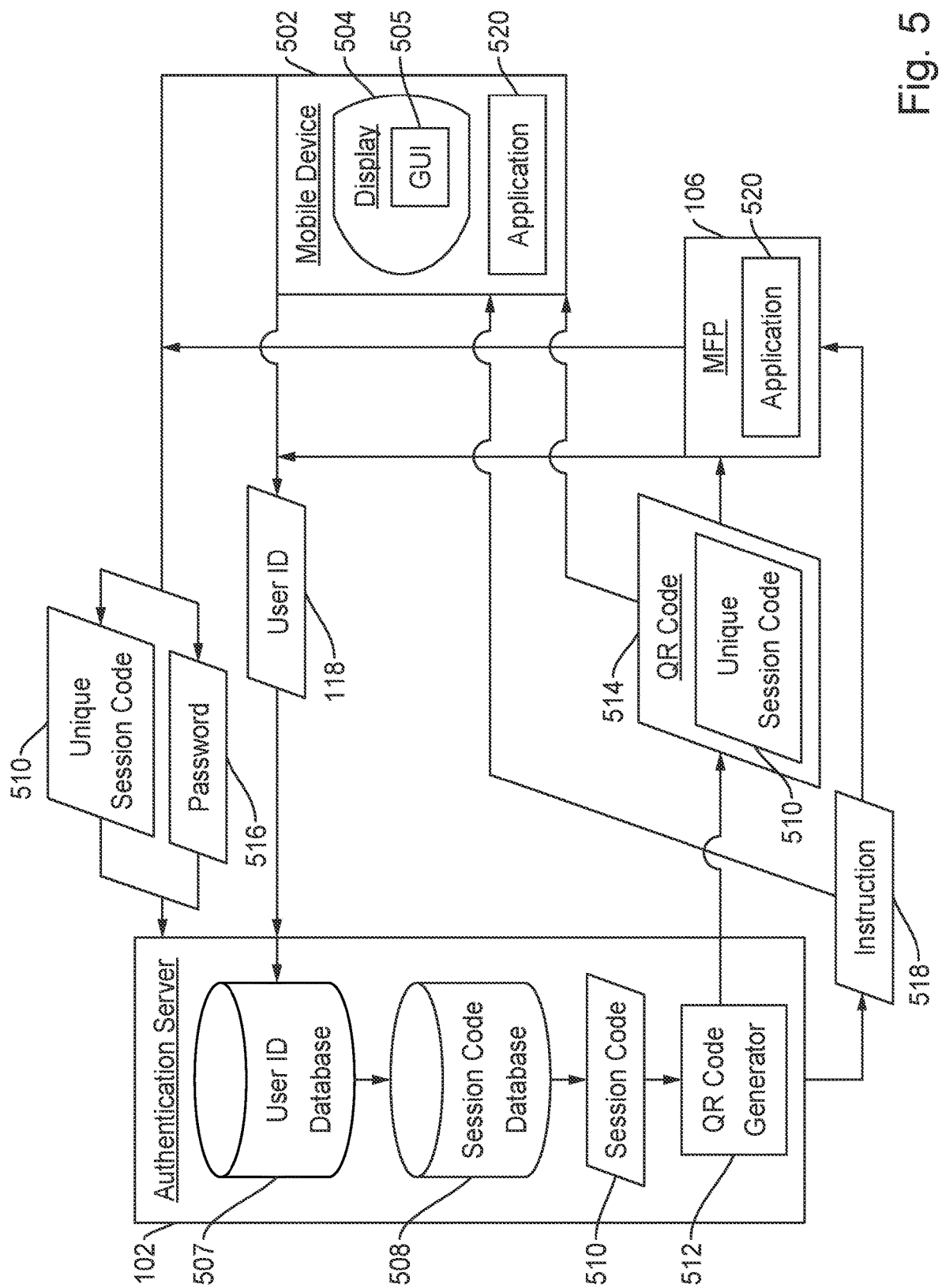
FIG. 5 illustrates a block diagram of identification-obfuscated authentication according to the disclosed embodiments.

FIG. 5 depicts a block diagram of identification-obfuscated authentication according to the disclosed embodiments. FIG. 5 includes mobile device 502, which may be included in system 100. Mobile device 502 may communicate with authentication server 102, MFP 106, scanning device 114, and printing device 112. Mobile device 502 includes display 504. Display 504 may be a screen that receives input from the user of mobile device 502. For example, a graphical user interface (GUI) 505 may be implemented using display 504 to interact with the user. Mobile device 502 also may include application 520 used for authentication operations.

To begin authentication operations, the user may enter their user identification 118 at mobile device 502. User identification 118 may refer to a unique designator for the user, such as user name, identification number, email address, and the like. User identification 118 may be stored on mobile device 502 so that the user does not have to re-enter the user identification each time for authentication. Application 520 may prompt the user to enter user identification 118 using GUI 505. User identification 118 is sent to authentication server 102, preferably over network 104.

Authentication server 102 receives user identification 118. Authentication server 102 may check its user identification database 507 to ensure that the user is authorized to access system 100. User identification database 507 may include user identifications and corresponding information for accepted users. If user identification 118 is not within user identification database 507, then authentication server 102 may send a notification 132 to mobile device 502 to re-enter the user identification data. Notification 132 also may be sent to administrator 130.

If user identification 118 is accepted, then authentication server 102 creates a unique session code 510 associated with user identification 118. Unique session code 510 may be created and stored in session code database 508. Session code database 508 may store the session code-user identification pairing. This pairing is not sent out of authentication server 102. Unique session code 510 also is provided to QR code generator 512. QR code generator 512 generates QR code 514. QR code 514 contains unique session code 510. QR code 514 does not contain any information about user identification 118.

QR code 514 is sent to mobile device 502. Alternatively, QR code 514 may be sent to MFP 106. QR code 514 is displayed on mobile device 502 or MFP 106. The user scans QR code 514 using mobile device 502. The scan captures session code 510 within QR code 514. Application 520 may execute on mobile device 502 to receive the captured data for QR code 514. Unique session code 510 may be derived from the captured data by application 520. Application 520 prompts the user to enter password 516. Password 516 is the password corresponding to user identification 118. The user may use GUI 505 to input password 516 into mobile device 502. Mobile device 502 sends password 516 and unique session code 510 to authentication server 102.

It should be noted that the above operations may be performed at MFP 106, scanning device 114, or printing device 112. The same actions may be taken to capture QR code 514 and obtain unique session code 510 therefrom. The user may enter password 516 at MFP 106 using its version of application 520. In other embodiments, QR code 514 is displayed at MFP 106 and the data captured by mobile device 502, which may capture password 516 to send with unique session code 510 to authentication server 102. Password 516 and unique session code 510 may be sent to authentication server 102 via a representational state transfer (REST) application programming interface (API).

Authentication server 102 receives the information from mobile device 502 or MFP 106. Using unique session code 510, authentication server 102 retrieves user identification 118 from session code database 508. With user identification 118, authentication server 102 may verify that password 516 is correct. If so, then authentication server 102 sends instruction 518 to mobile device 502 or MPF 106 that the user is authenticated and may use the devices within system 100. Unique session code 510 is deleted from session code database 508 and no longer associated with user identification 118. Unique session code 510 may no longer be used in authentication operations. Should the user need to authenticate again, a new unique session code 510 will be generated.

If authentication fails, such as password 516 does not match user identification 118, then notification 132 may be sent to mobile device 502 to alert the user. The user may try again. After so many failed attempts, authentication server 102 may send a command to application 520 to shutdown or block user ID 118 to prevent further requests for authentication.

Figure 6:
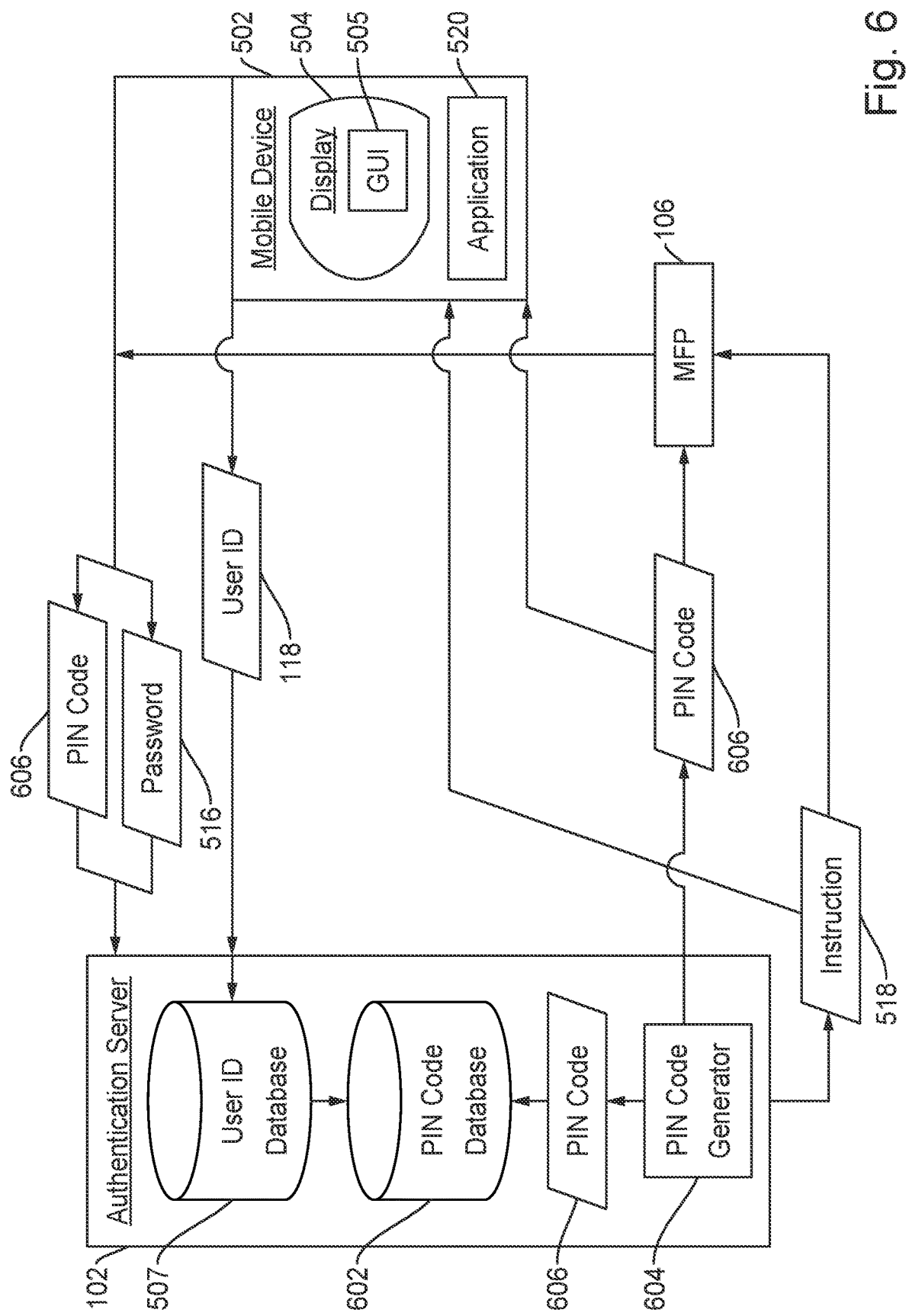
FIG. 6 illustrates another block diagram of identification-obfuscated authentication according to the disclosed embodiments.

FIG. 6 depicts another block diagram of identification-obfuscated authentication according to the disclosed embodiments. Some features of FIG. 5 are shown in FIG. 6, and may not be repeated here. User identification 118 is received by authentication server 102, preferably from mobile device 502. Alternatively, user identification may be received from MFP 106. Authentication server 102 verifies user identification 118 using user identification database 507. It then generates PIN code 606 using PIN code generator 604. PIN code 606 is a one-time PIN code that is associated with user identification 118. PIN code 606 may be stored in PIN code database 602 along with the paired user identification 118.

PIN code 606 is provided to mobile device 502. When the user wants to complete the authentication process, they may enter PIN code 606 onto mobile device 502, such as through application 520. Application 520 may then display a prompt through GUI 505 to request the user enter password 516 onto mobile device 502. Mobile device 502 then sends password 516 and PIN code 606 to authentication server 102. Password 516 and PIN code 606 may be sent to authentication server 102 via the REST API.

Authentication server 102 matches PIN code 606 to the PIN code and user identification pairing in PIN code database 602. In other words, authentication server 102 determines which user identification 118 is associated with PIN code 606 received from mobile device 502. Authentication server 102 then determines whether password 516 received with PIN code 606 matches the password associated with user identification 118. If so, then authentication server 102 may send instruction 518 to MPF 106 to allow access to the device. Instruction 518 also may be sent to mobile device 502 to allow access to that device.

Alternatively, a user identification and password prompt may be shown by GUI 505. Normally, the user would enter user identification 118 into a user identification field of GUI 505 and password 516 into a password field of GUI 505. The disclosed embodiments, however, will allow PIN code 606 to be entered into the user identification field. This feature may be preferred when the user does not want someone else to see their user identification 118 on display 504 of mobile device 502. As is known, some thieves take pictures or otherwise capture information from someone's mobile device that is displaying sensitive information. The disclosed embodiments prevent this by not displaying user identification 118 during authentication operations.

In some embodiments, PIN code 606 may be entered at MFP 106. It also may be entered at other devices within system 100. MFP 106 may prompt the user to enter password 516. MFP 106 may send password 516 and PIN code 606 to authentication server 102 to perform the authentication operations. Further, MFP 106 may act as mobile device 502 in the embodiments disclosed above.

Once authentication is successful, authentication server 102 deletes PIN code 606 from PIN code database 602. Thus, subsequent receipts of PIN code 606 will not allow access to mobile device 502 or MFP 106. Further, if user identification 118 is received again, then authentication server 102 will generate a new PIN code 606 for authentication operations. This feature prevents others from reusing PIN code 606.

Figure 7:
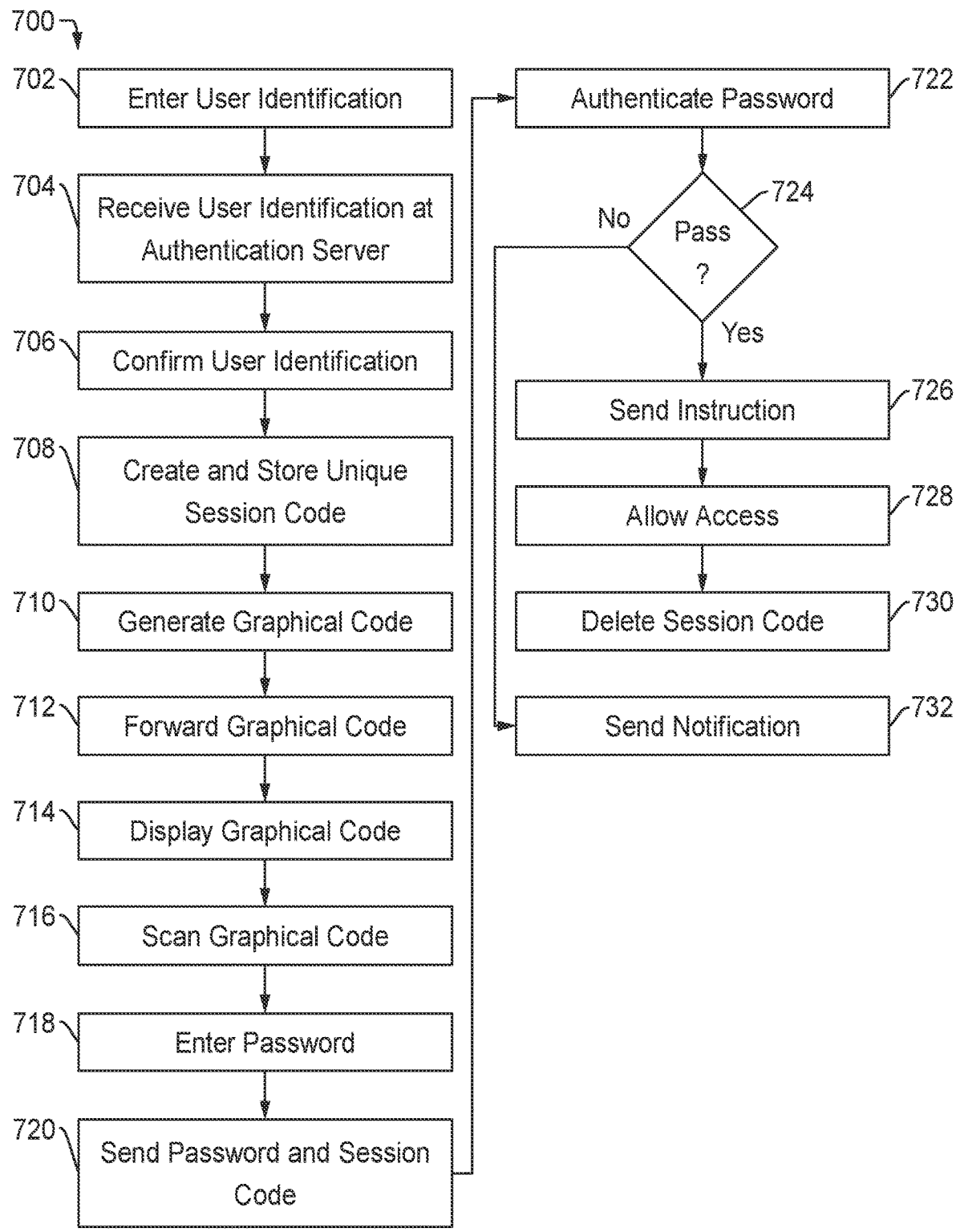
FIG. 7 illustrates a flowchart for performing authentication identification at a mobile device or a MFP according to the disclosed embodiments.

FIG. 7 depicts a flowchart 700 for performing authentication identification at mobile device 502 or MFP 106 according to the disclosed embodiments. Flowchart 700 may refer to FIGS. 1-6 for illustrative purposes. Flowchart 700, however, is not limited by the embodiments disclosed in FIGS. 1-6.

Step 702 executes by entering user identification 118. User identification 118 may be entered at mobile device 502 using GUI 505 and application 520. Alternatively, user identification 118 may be entered at another device within system 100, such as MFP 106. Step 704 executes by receiving user identification 118 at authentication server 102. Step 706 executes by confirming user identification 118 at authentication server 102. Authentication server 102 may query user identification database 507 to confirm that user identification 118 is valid.

Step 708 executes by creating unique session code 510. Session code 510 may be stored in session code database 508 with user identification 118. Step 710 executes by generating a graphical code, such as QR code 514, using QR code generator 512. QR code generator 512 also may be known as a graphical code generator. The graphical code includes session code 510. Thus, QR code 514 includes information to set forth session code 510 that is readable by a machine. Step 712 executes by forwarding the graphical code, or QR code 514, having session code 510 to mobile device 502, or, alternatively, to MFP 106.

Step 714 executes by displaying the graphical code with session code 510 on mobile device 502. Alternatively, the graphical code may be displayed at MFP 106. Step 716 executes by scanning the graphical code using mobile device 502 to capture session code 510. Mobile device 502 may scan the graphical code using application 520. It may scan the graphical code as it is displayed on MFP 106.

Step 718 executes by entering password 516 using GUI 505 at mobile device 502. After session code 510 is captured, application 520 may prompt GUI 505 to display a field to enter password 516. The user enters password 516 accordingly. Application 520 may pair password 516 and session code 510. Step 720 executes by sending password 516 and session code 510 to authentication server 102. In some embodiments, password 516 and session code 510 may be sent from MFP 106.

Step 722 executes by authenticating password 516 to invoke a user session at mobile 502 or MFP 106. Authentication server 102 authenticates the user session at mobile device by confirming session code 510 and password 516 using user identification 118. Authentication server 102 may use session code 510 to identify user identification 118 as paired in session code database 508. After retrieving user identification 118, authentication server 102 compares password 516 to the stored password for user identification 118, such as stored in user identification database 507.

Step 724 executes by determining whether the user session is authenticated, or passes the analysis by authentication server 102. If yes, then step 726 executes by sending instruction 518 to mobile device 502 or MPF 106 that the user session is approved and may begin. Step 728 executes by allowing access to mobile device 502 for the user session by the user. Step 730 executes by deleting session code 510 from session code database 508. If step 724 is no, then step 732 executes by sending notification 132 to mobile device 502 that the user session is not allowed.

FIG. 8 depicts another flowchart 800 for performing authentication identification at mobile device 502 or MFP 106 according to the disclosed embodiments. Flowchart 800 may refer to FIGS. 1-7 for illustrative purposes. Flowchart 800, however, is not limited by the embodiments disclosed in FIGS. 1-7.

Step 802 executes by executing steps 702 through 706 of flowchart 700. These steps are not repeated here but may be incorporated into flowchart 800. Step 804 executes by creating PIN code 606 using PIN code generator 604. PIN code 606 also is stored in PIN code database 602 along with corresponding user identification 118. Step 806 executes by sending PIN code 606 to mobile device 502 that provided user identification 118. Alternatively, PIN code 606 may be sent to another device in system 100, such as MFP 106.

Step 808 executes by entering PIN code 606 into mobile device 502 using GUI 505 and, if applicable, application 520. Application 520 then may prompt the user to enter password 516 in response to receiving PIN code 606. Step 810 executes by entering password 516 at mobile device 502. This step is similar to step 718 disclosed in flowchart 700. Step 812 executes by sending password 516 and PIN code 606 from mobile device 502 to authentication server 102. Alternatively, this information may be entered at MFP 106 and sent from that device to authentication server 102.

Step 814 executes by authenticating password 516 based on PIN code 606 and user identification 118. Authentication server 102 may use PIN code 606 to identify user identification 118 in PIN code database 602. Once user identification 118 is retrieved, authentication server 102 may verify password 516 against the user identification based on the corresponding password stored in user identification database 507. Step 816 executes by executing steps 724 through 732 of flowchart 700. These steps are not repeated here but may be incorporated into flowchart 800.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for authenticating a printing operation in a printing system, the method comprising:
    receiving a print job at a printing device, wherein the print job includes a security status;
    prompting a user identification to be entered at the printing device based on the security status;
    receiving the user identification at an authentication server from the printing device to initiate the printing operation for the print job;
    creating a unique session code at the authentication server in response to the user identification received from the printing device;
    displaying a graphical code at the printing device, wherein the graphical code includes the unique session code;
    scanning the graphical code using a mobile device to capture the unique session code;
    sending the unique session code and a password corresponding to the user identification to the authentication server;
    authenticating the printing operation at the printing device by confirming the unique session code and the password at the authentication server; and
    forwarding an instruction to the printing device to allow the printing operation for the print job.

2. The method of claim 1, wherein the unique session code corresponds to the security status of the print job.

3. The method of claim 1, further comprising listing the unique session code in a database at the authentication server.

4. The method of claim 3, further comprising deleting the unique session code from the database after the authenticating step.

5. The method of claim 4, further comprising preventing the unique session code from being used by the authentication server after it is deleted.

* * * * *